US008420196B2

(12) United States Patent
Kobayashi et al.

(10) Patent No.: US 8,420,196 B2
(45) Date of Patent: Apr. 16, 2013

(54) LABEL LAMINATE

(75) Inventors: Kenji Kobayashi, Tokyo (JP); Eiji Murayama, Tokyo (JP)

(73) Assignee: Lintec Corporation, Tokyo (JP)

( * ) Notice: Subject to any disclaimer, the term of this patent is extended or adjusted under 35 U.S.C. 154(b) by 1255 days.

(21) Appl. No.: 11/815,423

(22) PCT Filed: Mar. 14, 2006

(86) PCT No.: PCT/JP2006/304977

§ 371 (c)(1),
(2), (4) Date: Aug. 2, 2007

(87) PCT Pub. No.: WO2006/100961

PCT Pub. Date: Sep. 28, 2006

(65) Prior Publication Data

US 2009/0053450 A1 Feb. 26, 2009

(30) Foreign Application Priority Data

Mar. 23, 2005 (JP) ................................ 2005-083211

(51) Int. Cl.
*B32B 33/00* (2006.01)

(52) U.S. Cl.
USPC ................................ 428/43; 283/81; 428/131

(58) Field of Classification Search .................... 428/43, 428/131; 283/81
See application file for complete search history.

(56) References Cited

U.S. PATENT DOCUMENTS

| | | | | |
|---|---|---|---|---|
| 3,512,780 | A * | 5/1970 | Allison | 273/139 |
| 5,653,473 | A * | 8/1997 | Laszutko et al. | 283/81 |
| 2002/0134497 | A1 * | 9/2002 | Roth | 156/249 |

FOREIGN PATENT DOCUMENTS

| | | |
|---|---|---|
| JP | 2-86772 | 7/1990 |
| JP | 07-271306 | 10/1995 |
| JP | 2000-272278 | 10/2000 |
| JP | 2001-246882 | 9/2001 |
| JP | 2002-128035 | 5/2002 |
| JP | 2002-351372 | 12/2002 |
| JP | 2003-255837 | 9/2003 |
| JP | 2004-348087 | 12/2004 |
| JP | 2006-205413 | 8/2006 |
| JP | 09-197968 | 7/2007 |

OTHER PUBLICATIONS

Translation of JP 2002-128035, Tamaki, May 2002 (See Applicant's IDS filed Aug. 2, 2007).*

* cited by examiner

*Primary Examiner* — Brent O'Hern
(74) *Attorney, Agent, or Firm* — Lowe Hauptman Ham & Berner, LLP

(57) ABSTRACT

A label laminate includes a label L1 and a label sheet L2 formed separately from the label L1, and an unprinted surface of the label sheet L2 is laminated to an adhesive layer side of the label L1. Around the outer edge of the label sheet L2, an adhesive layer 12 of the label L1 is exposed and the label laminate is arranged so that, when stuck to an object via the adhesive layer 12, contents printed on the label sheet L2 can be concealed being sandwiched at the object W side.

10 Claims, 6 Drawing Sheets

LABEL LAMINATE

RELATED APPLICATIONS

The present application is based on, and claims priority from, International Application Number PCT/JP2006/304977, filed Mar. 14, 2006, and Japanese Application No. 2005-083211, filed Mar. 23, 2005, the disclosures of which are hereby incorporated by reference herein in their entirety.

FIELD OF THE INVENTION

The present invention relates to a label laminate, particularly to a label laminate suitable for concealing a printed surface of a label sheet when the label sheet is laminated to an adhesive layer side of a label and the label laminate is stuck to an adherend via an exposed adhesive layer of the label.

BACKGROUND OF THE ART

Recently, accompanying with universal expansion of the Internet, TV shopping and the like, in addition to the traditional over-the-counter sale, mail-order sales have prevailed and such a distribution system has become widely used that a deliverer delivers an article to a consumer in place of a seller. Accordingly, there is a possibility of leakage of information about the article, for example, article name, price of the article and the like via the delivery slip. Since such information identifies the content of the article purchased by the consumer, the information is confidential information that seriously relates to the privacy of the consumer, and since the price of the article has such a characteristic that the value of the article can be comprehended therefrom, the price of the article should be considered as confidential information in view of preventing robbery in the delivery process.

In this view point, when the delivery slip has such a structure that a plurality of slips is laminated and bundled, the article can be delivered to the consumer in a state that the article name and amount of money to be received are described on a part of the delivery slip ensuring the confidentiality. When a delivery slip of this type is employed, however, available label printer is limited.

The patent document 1 discloses a label, which can be used as a sheet type delivery slip. The label is a sheet type label arranged so that an open information form portion is formed continuously with a confidential information form portion, and when the confidential information form portion is turned-back to the rear face side of the open information form portion and the open information form portion is stuck to the object, the confidential information form portion is prevented from being seen from the outside.

Patent document 1 Japanese Patent Application Laid-Open No. 2001-246882

DISCLOSURE OF THE INVENTION

Problem to be Solved by the Invention

However, the label disclosed in the patent document 1 is obliged to have such an arrangement that the confidential information form portion is always formed integrally with the open information form portion because the open information form portion and the confidential information form portion are formed continuously. Therefore, when the label is used just as a label with printed information only, which requires no confidential information, there is such a disadvantage that the confidential information form portion adversely becomes an obstruction resulting in useless consumption.

Also, the label cannot employ such an arrangement that an adhesive layer is exposed all around the periphery of the turned-back label, the area along the turned-back edge cannot be stuck to the object. Consequently, particularly in a case of a label having a large plane area, there is such a disadvantage that the area along the turned-back edge floats or waves; and due to this, the label may be peeled-off unintentionally.

Object of the Invention

The present invention has been proposed in view of the foregoing disadvantages. It is an object to provide a label laminate that includes a label and a label sheet formed separately from each other, which is capable of concealing a printed surface of the label sheet when stuck to an adherend after laminating the label and the label sheet.

Another object of the present invention is to provide a label laminate in which the entire periphery of the label can be stuck to an object after laminating the label and the label sheet and sticking them to the object, and thereby preventing partial floating, and further, when the label is torn off, the information indicated on the label sheet can be easily confirmed.

Still another object of the present invention is to provide a label laminate a part of which can be easily torn off in a state being stuck to the object.

Means for Solving Problems

To achieve the object, a label laminate of the present invention comprises: a label having an adhesive layer; and a label sheet provided separately from the label, an unprinted surface of which being laminated to an adhesive layer side of the label, wherein the label laminate is arranged so that, when stuck to an object via an exposed adhesive layer of the label in a state that the label and label sheet are laminated with each other, contents printed on the label sheet can be concealed.

In the present invention, the label is formed with a tear-off line so that, when the label is torn off along the tear-off line, the label sheet is accompanied therewith.

Also, the label sheet is formed with a tear-off line at a position substantially overlapped with the tear-off line formed on the label.

Further, an arrangement may be employed such that the label sheet includes an adhesive layer and is laminated in a state that the adhesive layer thereof faces the adhesive layer of the label.

Furthermore, such an arrangement is employed that the label sheet is formed to have a smaller plane area than that of the label.

Still further, the adhesive layer of the label is exposed in a closed loop state around the outer edge of the label sheet.

Still furthermore, a turning-over section may be formed in a portion along the tear-off line.

Further, the label sheet may be laminated in a state partially protruding out of the outer edge of the label and the protruding part may be provided with non-sticking treatment to form a turning-over section.

Further, such an arrangement may be employed that the label sheet has no adhesive layer.

Here, the label sheet is laminated in a state partially protruding from the outer edge of the label and the protruding part forms a turning-over section.

Effect of the Invention

According to the present invention, when the label is stuck onto the object, the printed surface of the label sheet comes into a state being sandwiched between the object and the label sheet. Therefore, if the confidential information is printed on the label sheet, the confidential information can be concealed unless the label is cut off or peeled off. Particularly, when such arrangement is employed that the entire of the periphery of the label is stuck onto the object, the periphery of the stuck label can be reliably prevented from partially floating or the like, and thus the information concealing performance is further ensured.

Also, since the label and the label sheet are formed separately, each of the label and the label sheet may be used as a common label.

Further, when the tear-off line is formed in the label surface, the position where the label sheet is laminated with the label can be easily determined, and the label and the label sheet can be torn off finely. Here, when the turning-over section is provided, tearing operation of the label stuck on the object can be carried out easily.

Furthermore, since the label according to the present invention may employ either type of the label sheet; i.e., a type with adhesive layer or a type with no adhesive layer, degree of freedom in label laminate designing is increased. Even when the label sheet has the adhesive layer, by performing non-sticking treatment on a part thereof, the label sheet can be stuck onto the object in a state that the area provided with the non-sticking treatment protrudes out of the outer edge of the label. In this case, the label can be torn off easily by using the protruding portion as the turning-over section. In the case of the label sheet with no adhesive layer, a sheet of usual paper or the like may be used, and in this case, the protruding part can be used as the turning-over section without providing non-sticking treatment thereon.

EXPLANATION OF REFERENCE NUMERALS

10: turning-over section
11: turning-over section
12: adhesive layer
13: adhesive layer
L1: label
L2: label sheet
L2*a*: protruding part (turning-over section)
PL: first tear-off line
PL1: outer tear-off line
PL2: intermediate tear-off line
PL3: second tear-off line

BEST MODE FOR CARRYING OUT THE INVENTION

Hereinafter, preferred embodiments of the present invention will be described with reference to the drawings.

First Embodiment

Figure 1:
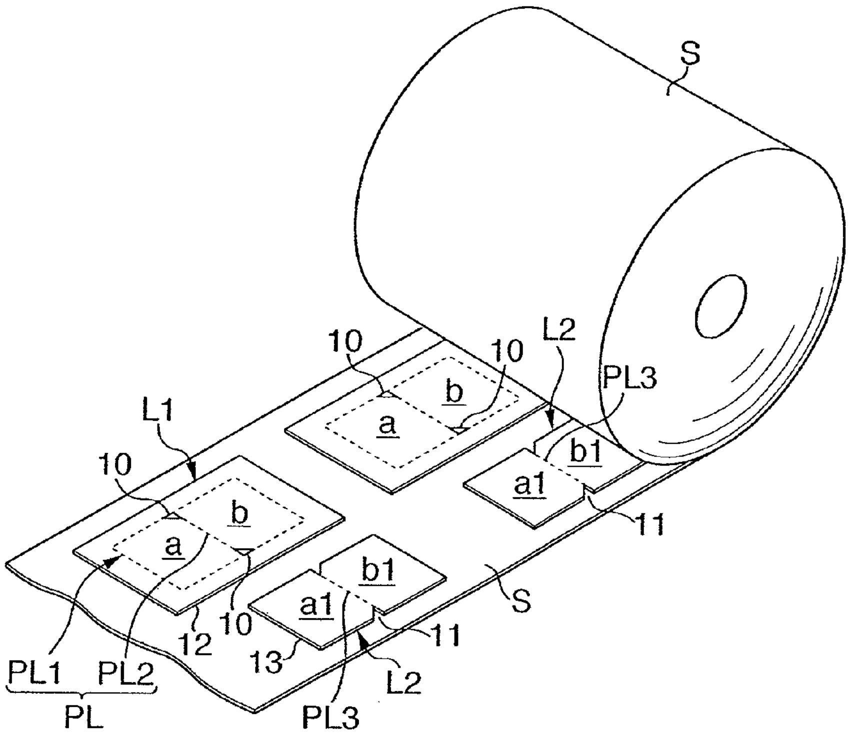
FIG. 1 is a schematic perspective view of a label laminate according to a first embodiment showing a state of a raw strip sheet before lamination.
Figure 2:
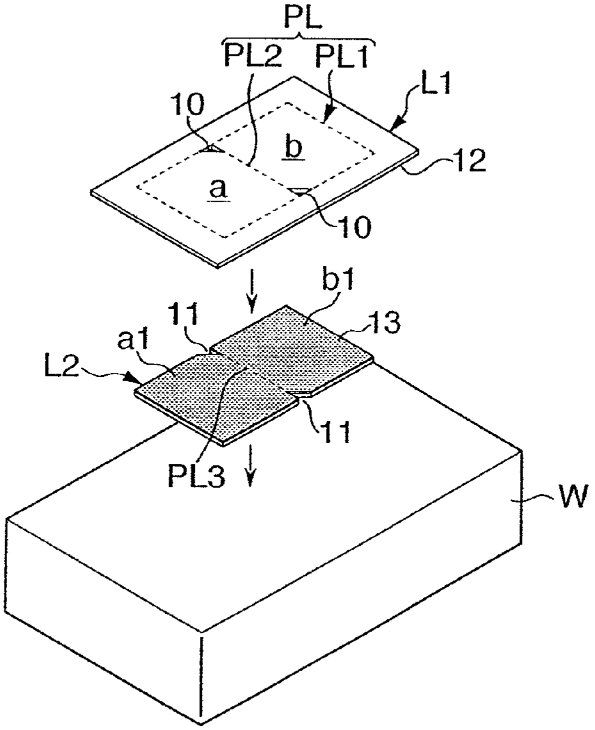
FIG. 2 is an exploded perspective view showing an application method of the label laminate in the embodiment.

FIG. 1 shows a schematic perspective view of a label laminate in a state of raw strip sheet in accordance with a first embodiment, and FIG. 2 shows a schematic perspective view of a label in use. In these figures, on one surface of a release liner S, which has a strip-like shape and is wound in a roll-like configuration, labels L1 are temporarily stuck via an adhesive layer 12 at predetermined intervals along an extending direction of the release liner S. Also, in a position beside the label L1 in a width direction of the release liner S, label sheets L2 each of which is usable as a pair with the label L1 are temporarily stuck via an adhesive layer 13. The label L1 and label sheet L2 in this embodiment are usable as, for example, an invoice which is stuck to an article to be delivered by a deliverer. Open information is printed on the label L1, while confidential information is printed on the label sheet L2. Here, as a base material for the label L1 and the label sheet L2, wood free paper, glassine paper, coated paper and the like are used. In this embodiment, a wood free paper is used. Also, as to the adhesive for the adhesive layers 12 and 13, general-purpose adhesives such as acrylic, rubber and silicone pressure-sensitive adhesives are used. In this embodiment, an acrylic adhesive is used.

The label L1 has a substantially rectangular shape in a plane view, and within the surface thereof, a first tear-off line PL of a perforated line or the like is formed. The first tear-off line PL includes an outer tear-off line PL1 having a substantially rectangular shape in plane view and an intermediate tear-off line PL2 located inside the outer tear-off line PL1 and extending in a width direction thereof; and both side areas a and b enclosed by the first tear-off line PL1 are formed so as to tear off a and b separately along the intermediate tear-off line PL2 as the boundary therebetween. Also, at each end portion of the intermediate tear-off line PL2, a turning-over section 10 composed of a notch having a substantially triangle shape in a plane view is formed.

The label sheet L2 is formed in a plane shape substantially corresponding to the outline of the outer tear-off line PL1, and a second tear-off line PL3 is formed in a location corresponding to the intermediate tear-off line PL2, so that both side areas a1 and b1 of the second tear-off line PL3 are torn off along with the areas a and b in the label L1. Further, at the edge portions of the second tear-off line PL3, a turning-over section 11 composed of a notch corresponding to the turning-over section 10 is formed.

In the state of raw strip sheet having the label L1 and label sheet L2 temporarily stuck to the release liner S, a predetermined printing is carried out on the respective surfaces via a printer or the like (not shown). On the label L1, as shown in FIG. 2, indication that does not require to be concealed, such as address, name or appellation of the receiver of an object W as an article to be delivered is printed; and on the label sheet L2, confidential information is indicated such as bill of receipt that indicates article name, price of the article and the like.

Figure 3:
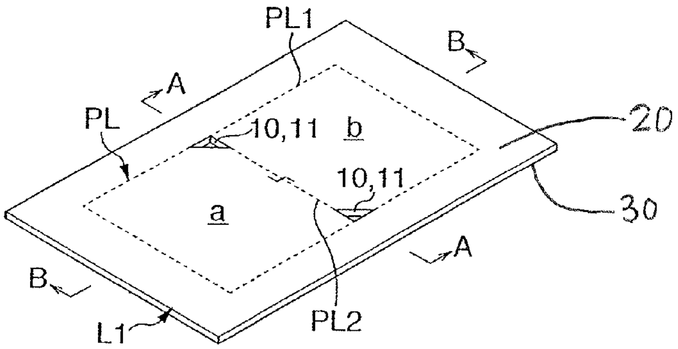
FIG. 3A is a schematic perspective view showing the label laminate in the embodiment.
FIG. 3B is a cross sectional view along a line A-A in FIG. 3A.
Figure 3:
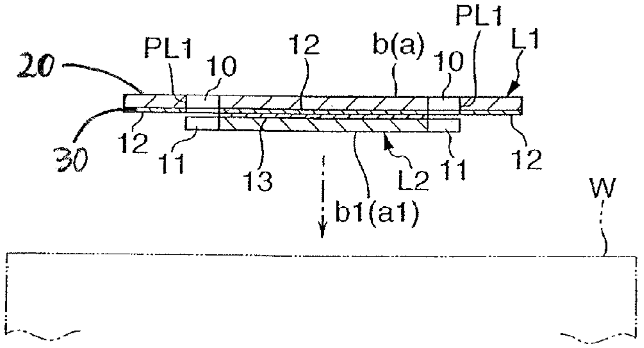

As shown in FIG. 3B, the label L1 has a first surface 20 and a second surface 30 opposite to the first surface 20, and the adhesive layer 12 entirely covers the second surface 30 of the label L1. When the label L1 and the label sheet L2 are used, each of them is peeled off from the release liner S and is laminated with one another in such a way that the adhesive layer 13 of the label sheet L2 faces the rear face side, i.e. the adhesive layer 12 side of the label L1 as shown in FIG. 3. Here, the lamination is carried out so that the outer edge of the label sheet L2 substantially coincide with the outer tear-off line PL1 in the label L1. The printing and lamination are automatically carried out by a label printer (general purpose printer such as a thermal printer, inkjet printer or laser printer) set forth in Japanese Patent Application No. 2005-17671, which has been previously filed by the applicant of the present invention.

Figure 4:
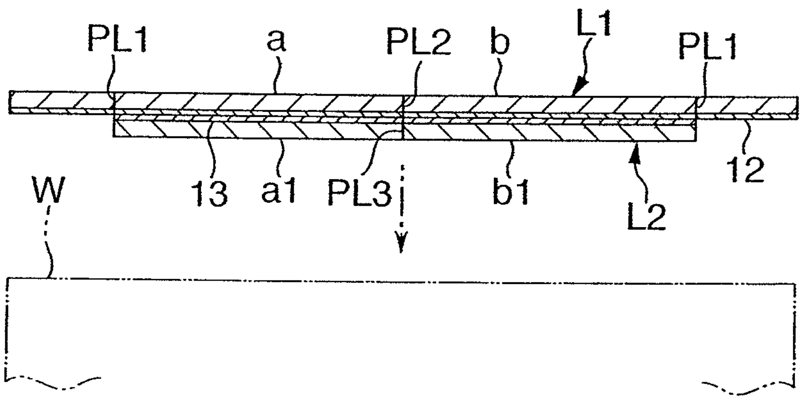
FIG. 4 is a cross sectional view along a line B-B in FIG. 3A.

Owing to the lamination after the printing, the adhesive layer 12 of the label L1 is exposed in a closed loop state around the outer edge of the label sheet L2, and the exposed area of the adhesive layer 12 is stuck to the object W as shown in FIG. 4. Therefore, the printed surface of the label sheet L2 is brought into a contacting state with the object W and is maintained in a state that the confidential information cannot be seen from the outside.

By placing a fingertip to the turning-over sections 10 and 11 from the label L1 side and handling to turn over the same, the label sheet L2 is accompanied with the peeled off area of the label L1, and thus the printed information on the label sheet L2 can be confirmed and also preserved.

Consequently, according to the above-described embodiment even the deliverer cannot see the information printed on the label sheet L2. Accordingly, through the application of the embodiment to mail-order sale or the like as a delivery slip, a label laminate capable of reliably ensuring the personal privacy can be provided.

Next, embodiments of the present invention other than the above-described embodiment will be described. It should be noted that, in the following descriptions, the components identical or equivalent to those in the first embodiment would be given with the identical reference numerals and the description therefore would be omitted or simplified.

Second Embodiment

Figure 5:
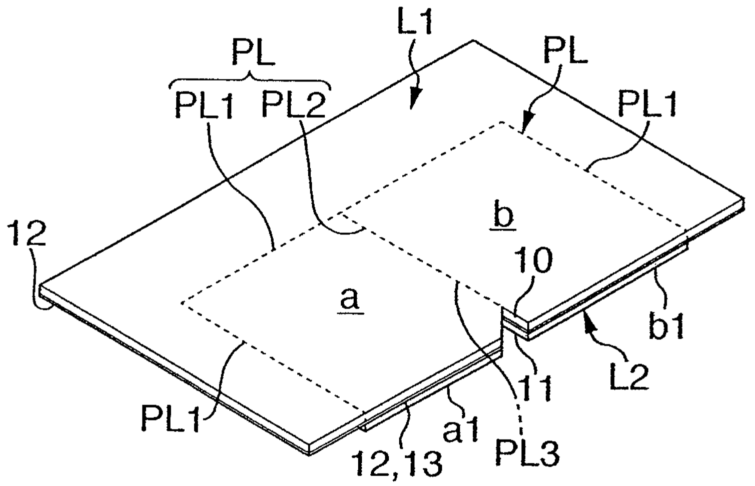
FIG. 5 is a schematic perspective view of a label laminate according to a second embodiment.

FIG. 5 shows a second embodiment of the present invention. This embodiment is characterized in a point that the label L1 and the label sheet L2 are laminated with each other in a state that the respective one edge substantially coincide with each other. Therefore, in this embodiment, the outer tear-off line PL1 is formed along a track having a substantially U-like shape, and the turning-over section 10, 11 is formed at one side of the intermediate tear-off line PL2.

In the second embodiment, the adhesive layer 12 of the label L1 is not exposed in a closed loop state but formed along the track having substantially U-like shape. Since the adhesive layer 13 of the label sheet L2 is stuck to the adhesive layer 12 of the label L1 so that a sheet configuration with stiff performance can be possessed as a whole, there is no disadvantage such that edge side where the turning-over section 10, 11 is located waves or flaps, and thus the confidentiality of the printed information of the label sheet L2 is also ensured. Moreover, in the second embodiment, the operation to tear off the label L1 can be carried out easily.

Third Embodiment

Figure 6:
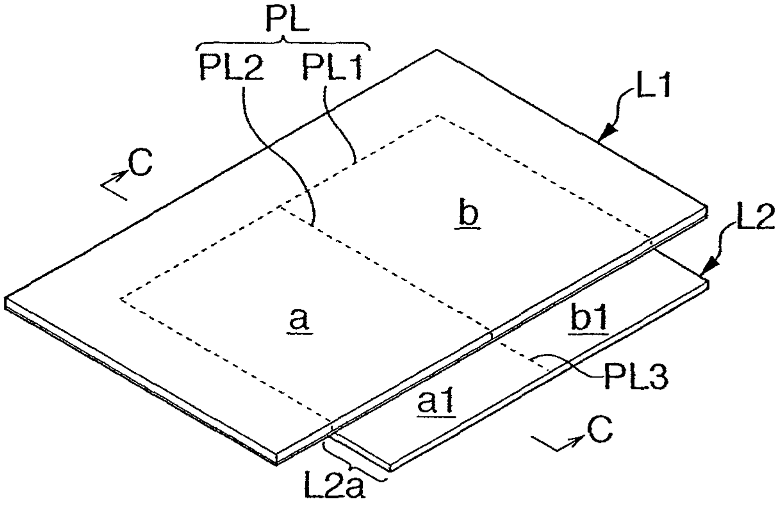
FIG. 6 is a schematic perspective view of a label laminate according to a third embodiment.
Figure 7:
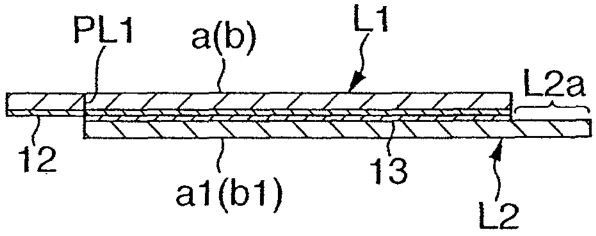
FIG. 7 is a cross sectional view viewed in a direction along a line C-C in FIG. 6.

FIG. 6 and FIG. 7 show a third embodiment of the present invention. This embodiment is a modification of the second embodiment. That is, the third embodiment is characterized in a point that the label sheet L2 and the label L1 are laminated with each other in such a way that a portion of the label sheet L2 protrudes outward from one end of the label L1. Accordingly, the protruding part L2*a* of the label sheet L2 is arranged to be a surface with non-sticking treatment.

According to the above-described third embodiment, the turning-over section formed with the above-described notch can be omitted because the protruding part L2*a* functions as a turning-over section in a state stuck to the object.

Fourth Embodiment

Figure 8:
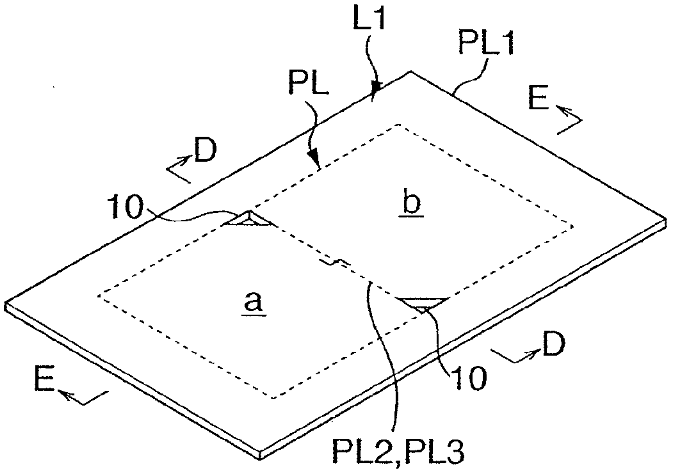
FIG. 8A is a schematic perspective view of a label laminate according to a fourth embodiment.
FIG. 8B is a cross sectional view along a line D-D in FIG. 8A.
FIG. 8C is a cross sectional view along a line E-E in FIG. 8A.
Figure 8:
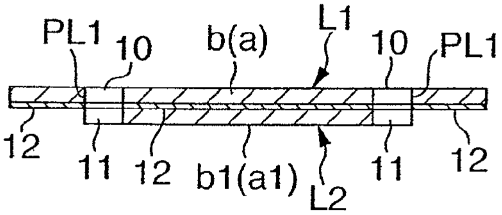
Figure 8:
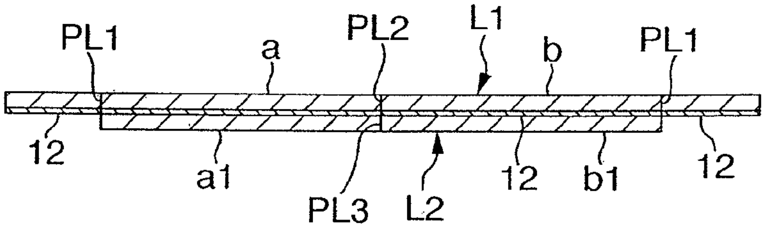

FIG. 8 shows a fourth embodiment of the present invention. This embodiment is characterized in a point that the label sheet L2 is composed of a sheet having no adhesive layer as shown in FIG. 8B and FIG. 8C. Other arrangements are substantially identical to those in the first embodiment.

According to the above-described fourth embodiment, since the label sheet L2 has no adhesive layer, the label sheet L2 can be formed of a plain paper or a thermal paper; and thus the label manufacturing cost can be reduced.

Fifth Embodiment

Figure 9:
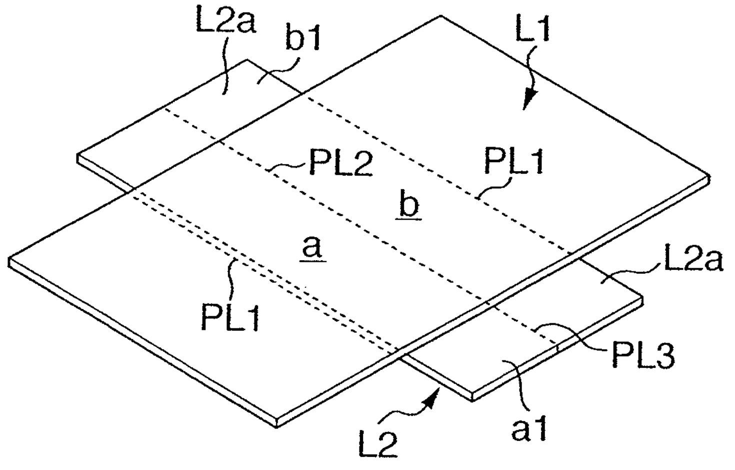
FIG. 9 is a schematic perspective view of a label laminate according to a fifth embodiment.
Figure 10:
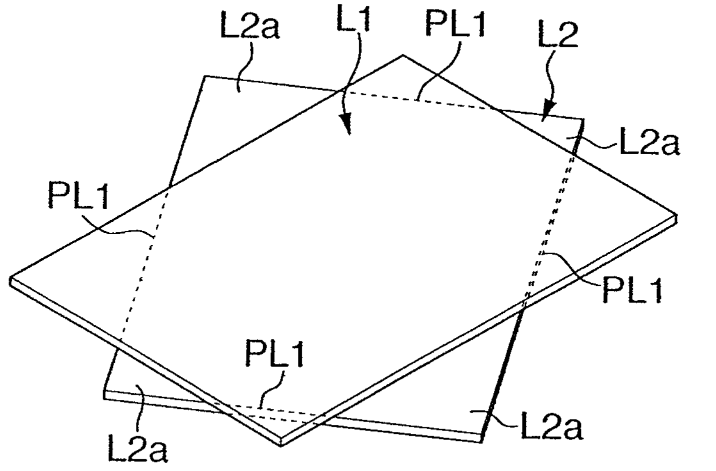
FIG. 10 is a schematic perspective view of another label laminate according to the fifth embodiment.

FIG. 9 and FIG. 10 show a fifth embodiment of the present invention. This embodiment is a modification of the fourth embodiment, and is characterized in a point that a part of the label sheet L2 is arranged to be stuck to the object in a state partially protruding out of the outer edge of the label L1. That is, as FIG. 9 shows, a type in which the label sheet L2 includes a pair of protruding parts L2*a* protruding in the two directions out of the opposing edges of the label L1 to form turning-over margins; and as FIG. 10 shows, a type in which turning-over portions are formed by means of a protruding parts L2*a* protruding out of the respective edges of the label L1.

In the above-described embodiment also, the same effect as that of the above-described embodiments can be obtained and further, since the label sheet L2 has no adhesive layer, such effect is obtained that the protruding parts L2*a* as the turning-over portions can be formed without performing non-sticking treatment.

The preferred arrangement, method and the like for carrying out the present invention have been disclosed so far. However, the present invention is not limited to the above description.

That is, the present invention has been illustrated and described mainly about specific embodiments. However, it is possible for those skilled in the art to add various modifications, if necessary, to the above-described embodiments with respect to the detailed arrangement such as the shape, location, layout and the like without departing from the technical spirit and the range of the object of the present invention.

For example, the tear-off lines of the label L1 and label sheet L2 applied to the present invention are not limited to the illustrated examples of arrangements. That is, in the above embodiments, there have been given examples of the case in which the label L1 and the label sheet L2 are arranged to tear off at plural sections, but a single tearing area may be formed for each. In this case, the intermediate tear-off line PL2 in the label L1 and the tear-off line PL3 in the label sheet L2 may be omitted. When such arrangement is employed, the turning-over portion may be formed along the outer tear-off line PL1 in the label L1. Also, the intermediate tear-off line PL2 may be increased in number to fragment further. In this case, the number of the tear-off lines in the label sheet L2 can be increased accordingly.

As to the plane shape of the label L1 and the label sheet L2 is not limited to a rectangular shape, but the labels having a various plane shape such as a polygonal shape, circular shape, elliptical shape can be employed. To be brief, the present invention permits various design changes as long as the printing is carried out on the label and the label is stuck in a state that the confidential information is concealed.

The invention claimed is:

1. A label laminate, comprising:

a label having opposite first and second surfaces and an adhesive layer entirely covering the second surface; and a label sheet provided separately from the label, the label sheet having a printed surface with a content printed thereon and another surface opposite the printed surface, the another surface being laminated to the adhesive layer and thereby defining an exposed portion of the adhesive layer, wherein the label laminate is arranged so that, when stuck to an adherend via the exposed portion of the adhesive layer of said label, the label and label sheet are laminated with each other, the content printed on said label sheet is concealed, and the printed surface is interposed between said label sheet and said adherend.

2. The label laminate according to claim 1, wherein said label is formed with a tear-off line so that, when the label is torn off along the tear-off line, said label sheet is accompanied therewith.

3. The label laminate according to claim 1, wherein said label sheet is formed with a tear-off line at a position substantially overlapped with the tear-off line formed on said label.

4. The label laminate according to claim 1, wherein said label sheet includes an adhesive layer and is laminated in a state that the adhesive layer thereof faces the adhesive layer of said label.

5. The label laminate according to claim 1, wherein said label sheet is formed to have a smaller plane area than that of the label.

6. The label laminate according to claim 2, wherein a turning-over section is formed in a portion along said tear-off line.

7. The label laminate according to claim 4, wherein said label sheet is laminated in a state partially protruding out of the outer edge of the label and the protruding part is provided with non-sticking treatment to form a turning-over section.

8. The label laminate according to claim 1, wherein said label sheet has no adhesive layer.

9. The label laminate according to claim 8, wherein said label sheet is laminated in a state partially protruding from the outer edge of the label and the protruding part forms a turning-over section.

10. A label laminate, comprising:

a label having an adhesive layer, and a label sheet provided separately from the label, the label sheet having a printed surface with a content printed thereon and another surface opposite the printed surface, the another surface being laminated to the adhesive layer and thereby defining an exposed portion of the adhesive layer, wherein the label laminate is arranged so that, when stuck to an adherend via the exposed portion of the adhesive layer of said label, the label and label sheet are laminated with each other, the content printed on said label sheet is concealed, and the printed surface is interposed between said label sheet and said adherend, and wherein the adhesive layer of the label is exposed in a closed loop state around the outer edge of said label sheet.

* * * * *